United States Patent
Keil et al.

[11] Patent Number: 5,988,434
[45] Date of Patent: Nov. 23, 1999

[54] DOSAGE WITHDRAWAL APPARATUS

[75] Inventors: Georg Keil, Gross-Bieberau; Karl Heinz Zulauf, Höchst; Hartmut Erlinghagen, Schmitten, all of Germany

[73] Assignee: Merz & Co. GmbH & Co. KG, Germany

[21] Appl. No.: 08/433,382

[22] PCT Filed: Oct. 28, 1993

[86] PCT No.: PCT/DE93/01030

§ 371 Date: Jan. 31, 1996

§ 102(e) Date: Jan. 31, 1996

[87] PCT Pub. No.: WO94/11711

PCT Pub. Date: May 26, 1994

[30] Foreign Application Priority Data

Nov. 12, 1992 [EP] European Pat. Off. .............. 92119371

[51] Int. Cl.⁶ .................................................. G01F 11/26
[52] U.S. Cl. ........................... 222/1; 222/109; 222/207; 222/438; 222/536; 222/454
[58] Field of Search .................... 222/207, 434, 222/437, 438, 439, 440, 109, 533, 534, 454–457, 536, 561, 1

[56] References Cited

U.S. PATENT DOCUMENTS

| | | | |
|---|---|---|---|
| 3,029,001 | 4/1962 | Blish | 222/207 |
| 3,105,618 | 10/1963 | Whitley | 222/207 |
| 3,172,293 | 3/1965 | Pickels | 222/456 |
| 3,859,900 | 1/1975 | Kiyuna | 222/434 X |
| 3,884,392 | 5/1975 | Hazard | 222/534 X |
| 3,907,174 | 9/1975 | Steiman | 222/153.13 |
| 4,830,226 | 5/1989 | Kong | 222/437 X |
| 4,875,600 | 10/1989 | D'Hoogue et al. | 222/454 X |
| 4,951,839 | 8/1990 | Kong | 227/437 X |
| 5,119,971 | 6/1992 | Reyman | 222/454 X |
| 5,392,966 | 2/1995 | Bunin | 222/454 |

FOREIGN PATENT DOCUMENTS

| | | |
|---|---|---|
| 0254138 | 7/1987 | European Pat. Off. . |
| 0285466 | 10/1988 | European Pat. Off. . |
| 0335505 | 10/1989 | European Pat. Off. . |
| 3133835 | 3/1983 | Germany . |
| 3420765 | 1/1987 | Germany . |
| 8600404 | 1/1986 | WIPO . |
| 9110115 | 7/1991 | WIPO . |

*Primary Examiner*—Kevin P. Shaver
*Attorney, Agent, or Firm*—Duane, Morris & Heckscher LLP

[57] ABSTRACT

An adjustable amount of liquid is reproducibly withdrawn from a container having a pre-chamber in free flow communication with the interior of the container. The pre-chamber is initially filled with an amount of liquid from the container and is in communication with a measuring chamber. The measuring chamber has an adjustably pre-set volume and is in communication with a closeable outlet. Thus, after the amount to be withdrawn from the measuring chamber has been adjusted, discharge of the preset volume is effected through the outlet without the necessity of additional manipulations such as shaking the container or separating the dosage metering part from the container to effect the discharge of a precise amount of liquid.

22 Claims, 2 Drawing Sheets

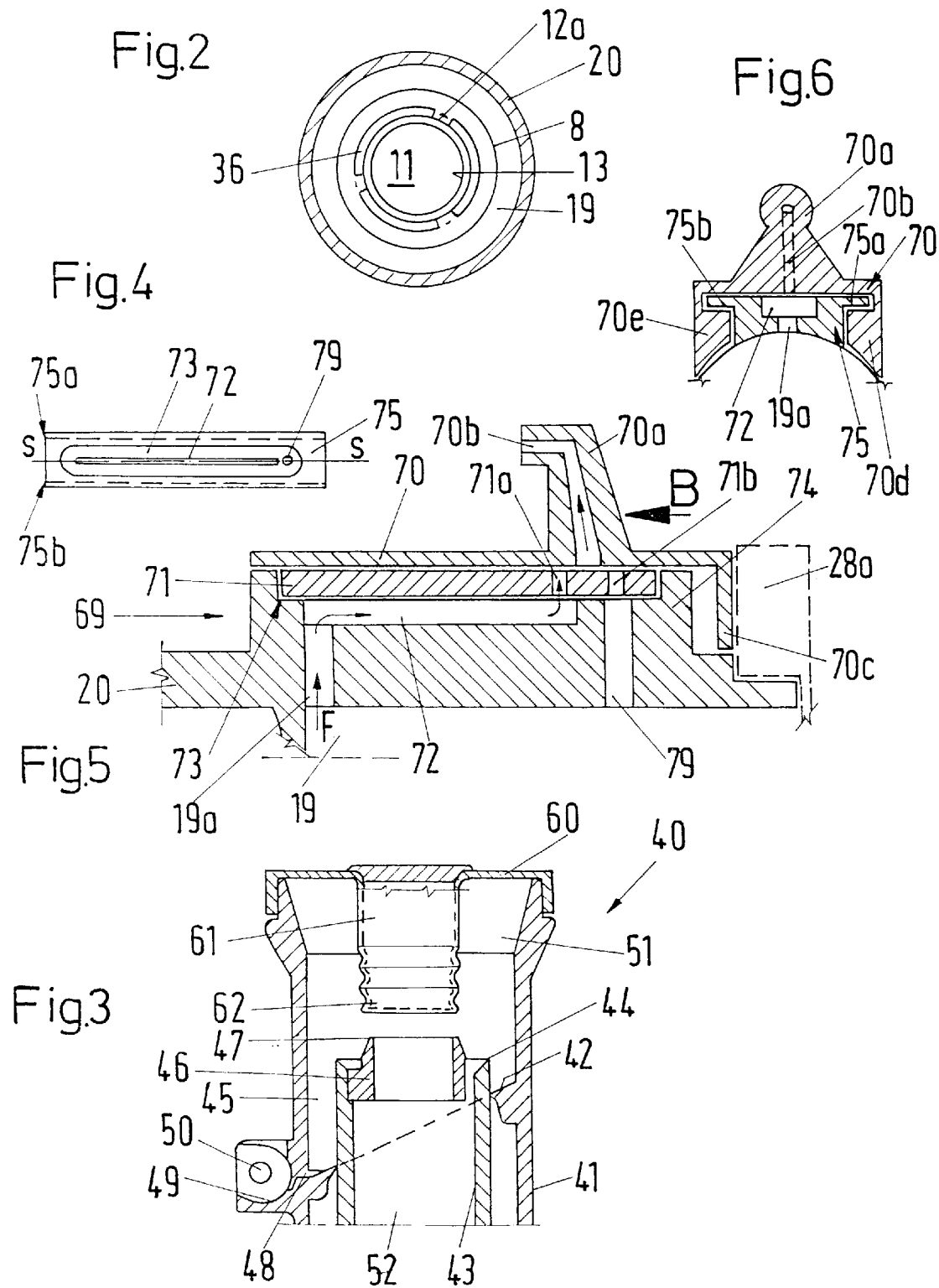

DOSAGE WITHDRAWAL APPARATUS

BACKGROUND OF THE INVENTION

1. Field of the Invention

This invention relates to an apparatus and a process for the reproducible withdrawal of an adjustable, amount of a liquid or an active substance from a container such as a glass vial.

A dosage metering apparatus includes a pre-chamber in free flow communication with the interior of a container, the pre-chamber being initially filled with an amount of liquid from the container and in communication with a measuring chamber. The measuring chamber has a pre-defined but adjustable volume and is in communication with a closeable outlet, so that after the amount to be withdrawn from the measuring chamber has been adjusted, it is not necessary for the user to perform any additional manipulations, such as shaking the container or separating the dosage metering apparatus from the container, to affect the discharge of a precise amount of liquid from the container.

2. Prior Art

In many fields of application it is necessary to repeatedly withdraw a precise dosage of a liquid pharmaceutical preparation or active medication substance from within a container. This is commonly achieved by pouring the contents of the container into a receptacle having a measuring scale marked on it. However, this method of metering a dosage amount is imprecise because it relies upon the careful manipulation of the container by the user.

One solution is to provide the container or vial containing the liquid with a head or cap mechanism inserted in the neck of the vial which provides for the displaceable accession of air into the interior of the vial causing the liquid to flow from within the vial as countable drops. While devices of this type precisely meter a dosage amount, they fail to provide for rapid discharge of the liquid from the container. As a result of the slow manner in which liquid flows from the interior of the vial, i.e. by countable drops, the user often shakes the vial in an attempt to accelerate the discharge of liquid. Shaking the vial results in an incorrect dosage being discharged from the vial due to the liquid being supplied in such a fast drop sequence that it is difficult to accurately count the drops.

U.S. Pat. No. 4,951,839-Kong shows seven different embodiments of a dosing apparatus which provides for the precise, repeated withdrawal of an adjustable dosage of liquid from a container such as a glass vial. FIG. 6 of Kong shows a cup-shaped container (cup-shaped housing) having cylindrical walls, which via a cylindrical attachment means having adjustable attachment arms which can be pushed onto a plurality of differently sized container necks. Two volumes A and B are formed in the cup by an overflow edge of a substantially cylindrical accordion-like sleeve mounted on the bottom of the cup-shaped container. The accordion-like sleeve allows the upper edge in the cup-shaped attachable container to be shifted such that the volumes of A and B change in opposite directions. A flat snap cover closes the top end of the cup-shaped container and can be opened, so that after removing the container and the attachment means from the bottle neck the liquid amount dosed in the dosage space B by the adjusted level of the overflow edge of the accordion-like sleeve can be poured out or emptied. This requires the user to carefully remove the container and attachment means in order to avoid spillage.

SUMMARY OF THE INVENTION

Accordingly, it is an object of the invention to provide an apparatus which allows for the accurate measurement and rapid discharge of an amount of liquid from within a container without requiring precise manipulation by the user. The apparatus permits the withdrawal of the liquid amount from the measuring volume in dropwise fashion or as a single continuous flow.

According to the invention, three chambers or spaces are in flow communication with one another. A pre-chamber is in free flow communication with an interior space of a container via a supply and discharge channel for the liquid. The contents of the glass vial are supplied via this supply and discharge channel into the pre-chamber disposed in the upper part of the dosage apparatus (in the upright condition). A measuring or dosing chamber of adjustable volume is separated as regards flow from the pre-chamber. In particular, the volume-adjustable measuring chamber is arranged angularly around the supply and discharge channel. Between the pre-chamber and the measuring chamber there is formed a precision measuring volume which is in free, unimpeded flow communication with both chambers. The precision measuring volume has a free flow communication—even though throttled as regards its throughput—to the supply and discharge channel and/or past this channel and back into the container interior.

When the apparatus has been mounted, the container interior, the pre-chamber and the measuring chamber are in free flow communication, adjoining one another at a joint overflow edge. The overflow edge confines the pre-chamber and measuring chamber. The measuring chamber and the pre-chamber are disposed in the apparatus such that when the apparatus has been mounted on the container the pre-chamber can be filled from the container interior by turning the container upside down. The measuring chamber is filled from the pre-chamber when the container is returned to the approximately upright or normal position. In this manner, it is possible to withdraw even small residual amounts of liquid in the container in a reliable and well dosed fashion.

A closable outlet—by flapping or sliding closure—communicates with the variable volume measuring chamber, from which the liquid can be withdrawn easily and reproducibly in a continuous or dropwise fashion. The withdrawal through the outlet can be effected by actuating the resilient bottom of the pre-chamber. This pumping action forces liquid from the measuring chamber out of the closable outlet. In an alternate embodiment, the closable outlet comprises a sliding closure. A sliding member thereof is supported in an axially movable fashion at the periphery of the dosage apparatus to release or obstruct a flow communication with the adjustable measuring chamber, depending on its axial position. The outlet nozzle fixed at the sliding member is sturdy and tapers radially outwardly, originating from a base region mounted on the sliding member and being wide in the peripheral direction. This provides an especially fracture-proof and easy-to-manage drop dispensing means. In this case, it is especially favorable when the liquid in the adjustable measuring chamber can be supplied to the outside in dropwise fashion. A flexible wall section of the sliding closure applies the pressure pulses.

The cooperation of three chambers, namely, the pre-chamber, the measuring chamber and the precision measuring volume, which is arranged therebetween, in addition to the throttled communication with the supply and discharge channel, makes mechanically movable parts in the dosage apparatus unnecessary for opening or closing the supply and discharge channels. It is unnecessary to disassemble the dosage apparatus or to provide a mechanical separation from the container during the discharge of liquid from the container. The three chambers allow the dosage apparatus to remain constantly screwed on the container, namely from the beginning to the complete emptying of the container. Caps, covers and other closure members are not required because the closable outlet enables a safe and captive closure technique.

The metered dosage apparatus is constructed of a material selected on the basis of the consistency of the liquid for providing free, slip free flow of liquid. Alternatively and in addition, the surfaces of the apparatus are coated a material which minimizes the adhesive capacity of the liquid on the surfaces.

The advantages of the process for operating or handling the apparatus developed as a withdrawal means as well as the production thereof are made even clearer by means of the below description of the drawings, which presents the gist of the invention on the basis of several embodiments.

BRIEF DESCRIPTION OF THE DRAWINGS

In the drawings,

FIG. 2 shows an overhead cross-sectional view of the upper region of the apparatus.

FIG. 3 is a cross sectional view of an alternate embodiment of the apparatus according to the invention.

FIG. 4 is an overhead view of a sliding valve which is used to discharge liquid from the apparatus.

FIG. 5 is a cross sectional view of the sliding valve of FIG. 4.

FIG. 6 is a view taken along line S—S of FIG. 4.

DETAILED DESCRIPTION OF THE PREFERRED EMBODIMENTS

Figure 1:
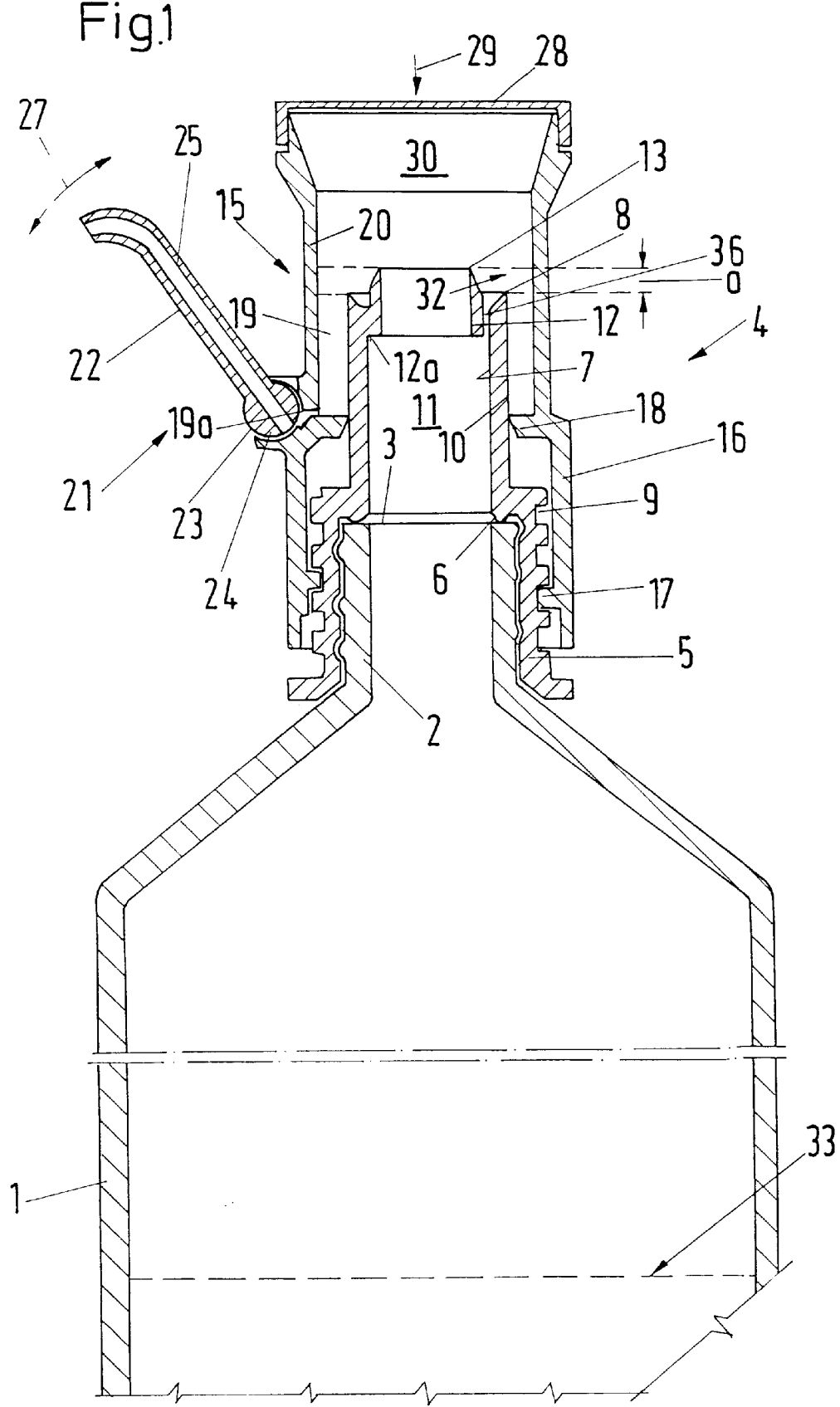
FIG. 1 is a cross sectional view the dosage apparatus of the invention shown mounted on a container or vial.

The apparatus according to the invention for the reproducible withdrawal of an incrementally, adjustable amounts of a liquid or a liquid active substance from a container can be used wherever it is required to withdraw a liquid accurately and rapidly from a container in a reproducible fashion. Dosage metering devices known as "dropping bottles" are employed for distributing liquids from vials or other containers. For example, "dropping bottles" are used to dispense pharmaceutical preparations from vials and other types of containers. Dropping bottles are employed for distributing other types of liquids form containers such as liquid spices, liquid sweeteners, alcoholic liquors, aromatic substances (bitter orange, angostura) and liquid fertilizers.

The present invention can be manufactured in a fashion so as to be attached permanently to the container with which it is to be used. However, it is preferred that the be manufactured for re-use so as to be repeatedly employed in a sealing and easily detachable and exchangeable manner for different containers.

The parts of the apparatus can be made of various materials. For certain regions those materials showing only a minor superficial adhesive capacity for the corresponding liquid are preferred in order to obtain the highest possible degree of dosage accuracy.

The embodiment according to FIGS. 1 and 2 shows a container 1 in the form of a glass vial which has a withdrawal opening at the container neck 2 and a thread for a closure cap of the container on the outer side of the container neck. Having screwed off the closure cap, the withdrawal apparatus 4 according to the invention can be screwed onto the container neck in a sealing manner. For this purpose, a tubular inner part 10 is provided which includes a pipe section 5 having an increased diameter which forms a shoulder. Pipe section 5 has an internal thread corresponding to the external thread of the container neck 2. In the screwed-on condition shown in FIG. 1 a sealing bead 6 is sealingly pressed onto the end face 3 of the container neck in the zone of the shoulder. A sealing element can also be embedded in the shoulder region instead. The pipe section 5 has an external thread onto which the lower wall section 16 of a cap-like member 15 can be screwed by a thread engagement element 17, so that the relative axial position of cap-like member 15 and the tubular inner part 10 is adjustable.

The cap-like part 15 has a cap bottom 28 which is a membrane resiliently deformable in the direction of arrow 29. The upper region 20 of the cap like member 15 surrounds the tubular inner part 10 at a predetermined radial distance, a measuring chamber 19 of variable volume being confined between the two regions. The tubular inner part 10 freely protrudes upwardly into the cap-like part 15 confining a pre-chamber 30 and has an overflow edge 8 developed at its upper end in a knife-shaped fashion in the illustrated example. The measuring chamber 19 is downwardly confined by an annular bottom wall 18 protruding from the inner side of the cap wall 20, whose radially inner region is developed as a lip seal which abuts slidingly but in a sealing fashion against the outer surface of the tubular inner part 10. The measuring chamber 19 can be developed as a chamber which is arranged centrally or offset from the center instead of having an annular shape. However, the illustrated development facilitates the accurate dosage of liquid. The inner surface 7 of the tubular inner part 10 confines an inlet channel 11 which in the mounted condition shown in FIG. 1 is in free flow communication with the opening of the container neck 2 and has substantially the same inner cross-section as this opening.

As shown in FIGS. 1 and 2, a bush or sleeve 12 is held at the upper end of the tubular inner part 10 by means of three or more bridges 12a. Bush 12 has a smaller diameter than the inner part 10 and has an overflow edge 13 at its upper end which protrudes from the overflow edge 8 of the inner part 10 by a predetermined degree a. The arrangement is made such that throttle channels 36 opening into space 11 are formed between the inner part 10 and the bush 12, which originate from the area between the overflow edges 8 and 13.

An outlet opening 19a is provided directly above the annular bottom wall region 18 of the measuring chamber 19. Outlet opening 19a is closable via a cylindrical valve 23 shown in cross-section in FIG. 1. The cylindrical valve portion is pivotally and sealingly supported in a corresponding cylindrical valve surface 24 of the cap-like member 15. The cylindrical valve portion 23 forms the inner end of a pivotable pouring nozzle 22 which has an outlet channel 25 and is pivotable, in the direction of arrow 27, between a closed position flapped against the cap-like member 15 and a withdrawal position protruding radially from the cap-like member 15. These above-described parts form the closable outlet 21 of the measuring chamber 19.

The volume of the measuring chamber 19 can be increased or reduced by turning the cap-like member 15 which moves it relative to the tubular inner part 10, namely in oppositely oriented fashion to form a corresponding reduction or increase of the pre-volume 30 depending upon the direction in which cap like member 15 is rotated. Instead of the screw thread 9, 17 it is also possible to provide a simple sliding fit or push fit of the cap-like member 15 on section 5 of the tubular inner part 10 for adjusting the measuring volume.

The overflow edges 8, 13 are disposed from each other at a pre-determined radial distance and a pre-determined axial distance a, and define a precision measuring volume 32 located between the measuring chamber 19 and the pre-chamber 30. Via the sleeve or the bush 12, the pre-chamber 30 is in free flow communication with the supply channel 11 and thus with the interior of the container 1. The measuring chamber 19 communicates with the pre-chamber 30 via the precision measuring volume 32.

In operation, the apparatus 4 is screwed onto the neck 2 of container 1. The desired size of the measuring chamber 19 can initially be adjusted by turning the cap-like part 15. An externally visible scale -not shown- serves for facilitating the accurate and reproducible adjustment of the measuring volume. Having adjusted the measuring volume 19, the container can be pivoted into the approximately upside-down position, so that liquid from the container can flow into the pre-chamber 30 independently of the liquid level 33. When returning the container to the approximately upright, normal position, part of the liquid flows through the supply or discharge channel 11 unimpededly back into the container 1. At the same time, the putting-upright step ensures that a sufficient liquid portion flows into the measuring chamber 19.

In order to guarantee that the measuring chamber 19 is filled, the precision measuring volume 32 provides for a supply of liquid which can reach the container interior only with a delay, namely through throttle channels 36, so that the measuring volume 19 is filled from this supply up to the overflow edge 8. The rest of the precision measuring volume which is not required for filling the measuring chamber 19 returns to container 1 through throttle channels 36 and into inlet channel 11. Thus, the precision dosing volume 32, defined by the overflow edges 8, 13, ensures that an accurate dosage can be supplied reliably to the measuring chamber 19. Thus, a simple, complete, accurate and repeatable dosed withdrawal of a pre-adjustable liquid amount from the container is possible, without the user having to carefully manipulate the vial or container to ensure that an accurate dosage is withdrawn.

In the upright position of the container 1 the nozzle 22 of the outlet 21 is pivoted from the flapped, closed position into the swung-out withdrawal position, so that the liquid present in the measuring chamber 19 can flow out through nozzle 22. The flow of liquid from measuring chamber 19 can be assisted by exerting pressure on the membrane-like cap bottom 28. This pumping action ensures that liquid drops adhering to the surfaces confining the measuring chamber 19 or the outlet channel 25 are expelled. Instead of a membrane-like cap bottom 28 the upper portion above the measuring chamber 19 can also be developed in another resiliently compressible manner. For example, it is possible to provide two parts telescopically slidable with respect to each other and acting as a pump plunger or a bellows-like wall portion at cap like member 15. It is also possible to withdraw the liquid present in the measuring chamber 19 in a dropwise manner by a well-calculated actuation of the cap bottom 28.

An alternate embodiment of the dosage metering apparatus 40 is shown in FIG. 3. A displacer body 61 is fixedly mounted centrally to deformable cap-bottom 60 so that the end face 62 of displacer body 61 protrudes into annular pre-chamber 51. Cap bottom 60 is depressed after the bottle or vial is turned upside down and pre-chamber 51 is filled. Once cap bottom 60 is depressed the end face 62 of displacer body 61 is forced into the opening formed between overflow edges 44 and 47. When the container is returned to the normal position the measuring chamber 45 will be initially filled. Releasing the cap bottom 60 allows liquid to flow through the throttle bores between the inner part 43 and the bush 46 or freely through the inner opening of the bush 46 into the container interior.

The interior of the displacer body 61 can be closed by a plug or the like (not shown). In order not to impede the pumping action by means of the membrane 60, the displacer body 61 developed as a closure member can also be made like a bellows—i.e. flexible—in its lower region 62.

If it is desired, the apparatus can be provided without bush 46 having an additional overflow edge 47. In such an embodiment, the displacer body 61 can act as a cap or closure for the inner space 52 of the inner part 43 when the cap bottom 60 is depressed.

As shown in FIG. 3, the annular bottom section 42 for the measuring chamber 45, which slidingly cooperates in a lip-seal fashion with the outer periphery of the inner part 43 can also extend in an upwardly sloping fashion from the outlet opening 48. This provides the advantages of reducing the volume of the measuring chamber without lowering the radial width of the measuring chamber 45. In addition, the sloped bottom of measuring chamber 45 assists the flow of the liquid from the measuring chamber 45d. The alternate embodiment of FIG. 3 also features the valve seat surface 49 cooperating with the valve member—not shown—and the support 50 for a cylindrical valve member.

FIGS. 4, 5 and 6 illustrate a sliding valve arrangement which may be employed as an alterative to the pivotable outlet nozzle 22, 25 with the pivotable support 23, 24 and the outlet opening 19a which are illustrated in FIG. 1. The sliding valve arrangement is particularly sturdy, can easily be managed and has a service life which is longer than the pivotable valve 22. Additionally, it is easier to manufacture and the closure action is safer, particularly in the case of viscous contents.

FIG. 4 shows a top view of a T-shaped support member 75, shown in cross-section in FIG. 6, which has two protruding slide rails 75a and 75b. A slide 70 is supported on the support member 76 in a longitudinally slidable manner along with an outlet nozzle 70a which includes an outlet channel 70b disposed therein. The nozzle 70a is stable and has a shape, as shown in FIG. 6, which tapers outwardly. The nozzle 70a is mounted on the slide member 70 in a fracture-proof fashion by a broad base portion. The inner region of the T-shaped support member 75 has an elongated channel 72 whose lower end 19a—markedly identifiable in cross-section S-S of FIG. 5—communicates with the variable dosage volume 19. This is achieved via the outlet opening 19a which is also shown in FIG. 1. The channel 72 can be open towards the outside, but it may also be closed/covered from the outside by a flexible buffer member 71. The flexible buffer member can be inserted in recess 73 and removed therefrom and adheres therein by frictional or positive engagement. When the flexible cover 71 is placed over channel 72, an opening 71a, which leads to the outside, is also provided in the flexible cover 71 at the upper end of channel 72. It is closed by the sliding member 70, but can be opened when the sliding member 70 is pushed downwardly into the direction of arrow B, so that the outlet channel 70b is brought into flow communication with the channel 72 via the communication opening 71a, and the liquid collected in the dosing chamber 19 can be dispensed dropwise by pressure pulses onto a flexible wall section 28 in the direction of arrow F. The sliding member 70 has an inwardly oriented section-wise annular stop member 70c at its upper end, which can reciprocate between the upper end 74 of the T-shaped support 75 and a covering cap 28 widened in the peripheral direction. This inwardly protruding stop member 70c may strike against both the peripherally widened region 28a of the covering cap and the upper end of the T-shaped member 75. Thus, it defines two end positions of the sliding member 70, in one end position of which the outlet channel 70b communicates with the elongated channel 72 via the communication opening 71a (left-hand stop in FIG. 5) and in the other position (right-hand stop in FIG. 5) the outlet channel 70b is displaced relative to the communication opening 71a in the axial direction, so that there is no free flow communication and the sliding valve is closed.

An additional ventilation channel 79 may be provided in the axial direction above the elongated channel 72. This ventilation channel can also open into the insert 71 via a communication opening 71b.

Counterparts or flanges 70e, 70d—adapted to fit into the slide rails 75a and 75b of the T-shaped holder 75 in negative contour—may be arranged at the elongated sides of the sliding member 70. In the peripheral direction of the cap wall 20, they may also have an inner end region developed like a segment of a circle. Hence, good and safe guidance results, and forces optionally occurring at the sliding valve are safely transmitted via the lateral guiding sections 70e, 70d of the sliding member 70 to the cap wall 20. The T-shaped holding member is relieved from such forces in this way.

We claim:

1. A process for reproducibly withdrawing an adjustable amount of a liquid from a container, comprising the steps of:
   (a) adjusting a volume of a measuring chamber of a dosage withdrawal apparatus attached to the container, by moving a bottom wall of the measuring chamber in an axial direction relative to a prechamber of the apparatus;
   (b) turning the container relative to an initial position, to supply liquid to the pre-chamber, the pre-chamber being defined by a volume of a top space of the apparatus, said liquid flowing from the container into the dosage withdrawal apparatus;
   (c) returning the container to the initial position, thereby causing the liquid in the pre-chamber to fill up a first portion of the adjusted volume portion by flowing directly into the measuring chamber, another portion of the liquid of the prechamber to return to the container, and a third portion of the liquid to remain above the measuring chamber partly filling up the measuring chamber and partly returning delayed to the container; and
   (d) dispensing the adjusted volume from the measuring chamber by applying adjusted volume out of an outlet nozzle.

2. A process for reproducibly withdrawing an adjustable amount of a liquid from a container, comprising the steps of:
   (a) adjusting a volume of a measuring chamber of a dosage withdrawal apparatus attached to the container, by moving a bottom wall of the measuring chamber in an axial direction relative to a pre-chamber of the apparatus;
   (b) turning the container relative to an initial position to supply liquid to the pre-chamber, the pre-chamber being defined by a volume of a top space of the apparatus, said liquid flowing from the container into the dosage withdrawal apparatus;
   (c) returning the container to the initial position, thereby causing most of the adjusted volume to be filled up from the volume of the liquid in direct flow communication and a remaining portion to be filled up during a delayed return of a portion of a volume of the liquid of the pre-chamber to the container, said delay being caused by a throttled channel between the pre-chamber and the container, said most of the adjusted volume and said remaining portion being equal to said adjusted volume.

3. A process for the production of a withdrawal apparatus for reproducibly withdrawing an adjustable amount of a liquid from a container, comprising the steps of:
   (a) attaching a cap member to an outer side of a pipe section so that said cap member can be variably positioned in an axial direction relative to the pipe section, said pipe section protruding into the cap member and having a passage which opens into the cap member, said cap member being in free flow and throttled communication with the pipe section;
   (b) forming an outlet opening proximal to a bottom wall of the cap member said outlet opening having an outer channel including means for opening and closing said outlet opening.

4. The process according to claim 3, further comprising determining a volume of the cap member based upon a viscosity and a volume of the liquid to be dispensed.

5. The process according to claim 3, in which
   (a) a precision measuring volume is formed which is in communication with the cap member when the container is in an initial position;
   (b) an outlet to the container is in communication with the precision measuring volume, wherein a flow rate of fluid to the precision measuring volume is substantially less than a flow rate of fluid from the precision measuring volume to the cap member.

6. The process according to claim 5, further comprising the steps of:
   (a) arranging a dispensing nozzle which can be swung out, on an outside of the withdrawal apparatus, said dispensing nozzle being in communication with the cap member via the outlet opening; and
   (b) forming the dispensing nozzle so as to be pivotable between a position in which the outlet opening is closed and a position in which the outlet opening is open;
   (c) wherein a resilient pumping membrane is formed at the apparatus via which pressure pulses can be applied to the interior of container and withdrawal apparatus to effect one of drop-wise and constant release of an active substance from the container.

7. An apparatus for the reproducible withdrawal of an adjustable amount of liquid from a container, said apparatus being mountable to the container and comprising:
   a pre-chamber having a pipe section as a first channel for providing free flow communication with an interior of the container and having a second channel, said second channel being confined with respect to the first channel for providing a throttled communication with said interior of the container;
   a measuring chamber having a bottom wall and means for adjusting an axial depth of the measuring chamber relative to the pipe section and having a third channel for providing free flow communication with the pre-chamber for adjusting a volume of the measuring chamber; and,
   further comprising means defining an outlet opening for dispensation of liquid from the measuring chamber, said opening providing a fourth channel for communication with the measuring chamber and having means for alternately opening and closing said outlet opening for dispensing said adjusted volume of liquid and for providing said adjusted volume of liquid, respectively.

8. The apparatus according to claim 7, wherein the pre-chamber is closed at its top by a flexible pumping membrane, the outlet opening comprising a valve means for automatically opening the outlet opening when depressing the flexible pumping membrane in an axial direction.

9. The apparatus according to claim 7, wherein the means for alternately opening and closing said outlet opening comprises a pouring nozzle, the pouring nozzle being pivotable between a closed position and an open position.

10. The apparatus according to claim 7, wherein the means for alternately opening and closing said outlet opening comprises a sliding valve comprising:

a sliding member, with an outlet channel, the sliding member being movable between a first and a second stop;

a holding member, T-shaped in cross-section, arranged to support the slidable sliding member in axially movable fashion; and, a means for channelling fluid that extends in a sliding direction, arranged with the holding member, having one end opening at the bottom of the measuring chamber and an other end in closable flow communication with the outlet channel, depending on which of the first and second stops the sliding member is against.

11. The apparatus according to claim 7, wherein the pipe section as the first channel is fixedly mountable to the container, and in the second channel a plurality of spaced bridges is provided so as to form a plurality of throttle channels between an inner edge of the measuring chamber and a peripheral edge of the first channel, to form a precision measuring volume for said liquid around said first channel and above said measuring chamber.

12. The apparatus according to claim 7, the means for adjusting comprising a cap member which is mounted to the pipe section as the first channel so as to be movable in an axial direction relative to the pipe section, said cap member having a lower portion and an upper portion said lower portion forming a bottom wall of the measuring chamber and abutting the pipe section to provide a sealing contact therewith.

13. The apparatus according to claim 12, wherein the upper portion of the cap member defines the pre-chamber and the pipe section is circular and protrudes into the cap member so that the measuring chamber is defined by a radial area between the cap member and the pipe section.

14. The apparatus according to claim 12, wherein the pipe section and cap member are mountable to the container and to each other, respectively, so as to form a tight seal therebetween.

15. The apparatus according to claim 12, wherein the bottom wall is inclined downwardly from the pipe section as the first channel, towards the means defining the outlet opening.

16. The apparatus according to claim 12, wherein the top of the cap member is closed by a flexible pumping membrane.

17. The apparatus according to claim 16, wherein a displacer body is mounted to the flexible pumping membrane opposite the first channel so as to protrude into the pre-chamber.

18. The apparatus according to claim 17, wherein the displacer body comprises a resiliently deformable member which closes the third channel when the flexible pumping membrane is depressed in an axial direction.

19. The apparatus according to claim 11, wherein a peripheral edge of the first channel forms a first overflow edge and the inner edge of the measuring chamber forms a second overflow edge mounted axially lower than the first overflow edge.

20. The apparatus according to claim 19, wherein the first overflow edge is displaced an axial distance from the second overflow edge, said axial distance defining a height of the precision measuring volume wherein the plurality of throttle channels, located between the first and second overflow edges, are in communication with the first channel.

21. The apparatus according to claim 20, wherein the apparatus is mountable to a top of the container such that when the container is placed in a generally inverted position, fluid is caused to flow from the interior of the container into the pre-chamber.

22. The apparatus according to claim 21, wherein returning the container to a generally upright position causes fluid to flow simultaneously from the pre-chamber into the measuring chamber and through the precision the precision measuring volume and throttle channels back into the interior of the container.

* * * * *